United States Patent
Matsuda et al.

(10) Patent No.: US 6,730,728 B2
(45) Date of Patent: May 4, 2004

(54) PROPYLENE RESIN COMPOSITION EXCELLENT IN MOLDABILITY AND PHYSICAL PROPERTIES

(75) Inventors: Masatoshi Matsuda, Toyota (JP); Hisayuki Iwai, Toyota (JP); Takayuki Nagai, Toyota (JP); Yukihito Zanka, Yokkaichi (JP); Mitsuhiro Murayama, Yokkaichi (JP); Yuji Fujita, Yokkaichi (JP); Hironari Sano, Yokkaichi (JP)

(73) Assignees: Japan Polychem Corporation, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 127 days.

(21) Appl. No.: 09/926,063

(22) PCT Filed: Dec. 26, 2000

(86) PCT No.: PCT/JP00/09237

§ 371 (c)(1),
(2), (4) Date: Jan. 11, 2002

(87) PCT Pub. No.: WO01/48083

PCT Pub. Date: Jul. 5, 2001

(65) Prior Publication Data

US 2003/0092818 A1 May 15, 2003

(30) Foreign Application Priority Data

Dec. 27, 1999 (JP) .............................. 11-368952

(51) Int. Cl.$^7$ ................................. C08K 3/34
(52) U.S. Cl. ....................................... 524/451
(58) Field of Search ......................... 524/451

(56) References Cited

FOREIGN PATENT DOCUMENTS

| EP | 636 650 | 2/1995 |
|----|---------|--------|
| JP | 1995-053843 | 2/1995 |
| JP | 1996-020684 | 1/1996 |
| JP | 1998-324725 | 12/1998 |
| JP | 1999-029688 | 2/1999 |
| JP | 1999-043565 | 2/1999 |
| JP | 1999-189699 | 7/1999 |
| JP | 1999-189700 | 7/1999 |

*Primary Examiner*—Kriellion A. Sanders
(74) *Attorney, Agent, or Firm*—Westerman, Hattori, Daniels & Adrian, LLP

(57) ABSTRACT

The present invention provides a resin composition high in melting flow, exhibiting good properties, excellent in moldability and shrinkage properties, and hence suitable for automobile exteriors, by including (A) propylene/ethylene block copolymer having a melt flow rate (MFR) of 100 to 200 g/10 min., its propylene homopolymer component having an MFR of 210 to 400 g/10 min. and isotactic pentad fraction of 0.98 or more, and its copolymer portion containing propylene at 65 to 85% by weight; 50 to 70% by weight, (B) ethylene/octene and/or ethylene/butene random copolymer; 10 to 25% by weight, (C) styrene-based hydrogenated block copolymer rubber; 4 to 9% by weight and (D) talc; 16 to 24% by weight.

2 Claims, No Drawings

PROPYLENE RESIN COMPOSITION EXCELLENT IN MOLDABILITY AND PHYSICAL PROPERTIES

FIELD OF THE INVENTION

This invention relates to a polypropylene-based resin composition comprising a propylene/ethylene block copolymer, ethylene/octene and/or ethylene/butene copolymer, styrene-based hydrogenated block copolymer rubber, and talc, good in injection moldability, flexural modulus of elasticity, resistance to impact and tensile elongation, excellent in internal molding pressure characteristics during the molding process, and suitable for injection-molded articles, e.g., automobile exteriors.

BACKGROUND OF THE INVENTION

It is widely known that polypropylene-based resin composition, comprising a polypropylene resin incorporated with an ethylene-based thermoplastic elastomer component (e.g., ethylene/propylene or ethylene/butene copolymer) and inorganic filler (e.g., talc), has been going into automobile parts. Various polypropylene resins, rubber components and inorganic fillers have been investigated and proposed, in order to improve moldability, mechanical properties and outer appearances of the polypropylene-based resin compositions.

Automobile parts are demanded to be produced by high-cycle molding and to be thinner articles, and require the materials of higher melting flow and rigidity. Some of the attempts to improve these properties have led to development of the compositions disclosed by Japanese Patent Laid-Open Nos.53843/1995 and 20684/1996. However, materials of still higher melting flow are required for the articles to be produced by high-cycle molding at low pressure, and the above compositions are still insufficient in melting flow to meet the above requirements.

Japanese Patent Laid-Open Nos.324725/1998, 29688/1999 and 43565/1999 also disclose the materials of still higher melting flow, but are silent on internal molding pressure during the molding process. Therefore, they are still insufficient in melting flow for producing large-size molded articles, e.g., bumpers.

Moreover, it is preferable that molded articles, e.g., bumper, can be made of the same material whether it is to be painted or not, viewed from material unification, for which such a material should have as small a difference as possible between molding shrinkage and shrinkage after heating. The above patent publications are completely silent on this matter.

It is an object of the present invention to provide a resin composition high in melting flow, exhibiting good properties, excellent in moldability, shrinkage properties and mechanical properties while solving the above problems, and suitable for automobile exteriors, e.g., bumpers, rocker moldings, sidemoldings and overfenders.

DISCLOSURE OF THE INVENTION

The inventors of the present invention have found, after having extensively studied to solve the above problems, that the resin composition high in melting flow, exhibiting good properties and excellent in internal molding pressure can be obtained by incorporating a specific ethylene/α-olefin copolymer elastomer, specific styrene-based hydrogenated block copolymer rubber and talc, each at a specific content, in a propylene/ethylene block copolymer having high melting flow, very high crystallinity and propylene homopolymer component, reaching the present invention.

The first invention provides a polypropylene-based resin composition comprising the following components (A) to (D), characterized by its excellent moldability and other properties.

Component (A): Propylene/ethylene block copolymer having a melt flow rate (MFR) of 100 to 200 g/10 min., its propylene homopolymer component having an MFR of 210 to 400 g/10 min. and isotactic pentad fraction (P) of 0.98 or more, and its copolymer portion containing propylene at 65 to 85% by weight; 50 to 70% by weight Component (B): Ethylene/octene and/or ethylene/butene random copolymer, containing the comonomers at 28% by weight or more for the copolymerization and having an MFR of 0.5 to 20 g/10 min.; 10 to 25% by weight Component (C): Styrene-based hydrogenated block copolymer rubber having the following structure, containing the segment A of polystyrene structure at 1 to 25% by weight; 4 to 9% by weight A-B, or
A-B-A wherein, the segment A is a polystyrene structure and segment B is an ethylene/butene or ethylene/propylene structure.

Component (D): Talc, having an average particle size of 10 μm or less, determined by the laser-aided diffractometry; 16 to 24% by weight The second invention is the polypropylene-based resin composition of the first invention whose resin composition has the following properties; internal molding pressure: 38 MPa or less, MFR: 36 to 50 g/10 min., flexural modulus of elasticity: 1750 MPa or more, brittleness temperature: −15° C. or lower, tensile elongation: 200% or more, and difference between molding shrinkage and shrinkage after heating: 1.5/1000 or less.

PREFERRED EMBODIMENTS OF THE INVENTION

The present invention provides the polypropylene-based resin composition, comprising (A) propylene/ethylene block copolymer, (B) ethylene/octene and/or ethylene/butene random copolymer, (C) styrene-based hydrogenated block copolymer rubber, and (D) talc. Each of these components is described in more detail.

[I] Components of the Resin Composition
(A) Propylene/Ethylene Block Copolymer (Component (A))
(1) Properties of the Propylene/Ethylene Block Copolymer The propylene/ethylene block copolymer (Component (A)) for the polypropylene-based resin composition of the present invention has a melt flow rate (MFR at 230° C. and a load of 2.16 kg) of 100 to 200 g/10 min., preferably 105 to 170 g/10 min., more preferably 105 to 140 g/10 min. At an MFR less than 100 g/10 min., the propylene/ethylene block copolymer is insufficient in melting flow and exposed to a high internal molding pressure during the molding process for producing the thin-wall articles. This requires a molder of high clamping force, and deteriorates productivity. At an MFR more than 200 g/10 min., on the other hand, the propylene/ethylene block copolymer will have insufficient brittleness temperature and tensile elongation.

The propylene/ethylene block copolymer is preferably adjusted for its MFR during the polymerization process. When adjusted after the polymerization process with an organic peroxide, e.g., diacyl peroxide or dialkyl peroxide, the propylene/ethylene block copolymer needs a higher internal molding pressure during the molding process than the one adjusted during the polymerization process, and is unsuitable.

The propylene homopolymer component of the propylene/ethylene block copolymer has an MFR of 210 to 400 g/10 min., preferably 220 to 350 g/10 min., more preferably 250 to 300 g/10 min., and an isotactic pentad fraction (P) of 0.98 or more, preferably 0.985 or more.

The propylene homopolymer component of the propylene/ethylene block copolymer will needs a higher internal molding pressure during the molding process when its MFR is more than 400 g/10 min., and insufficient brittleness temperature and tensile elongation when its MFR is less than 210 g/10 min.

The propylene/ethylene block copolymer will have an insufficient flexural modulus of elasticity when isotactic pentad fraction (P) of its propylene homopolymer component is less than 0.98.

Isotactic pentad fraction (P) means the isotactic fraction of the pentad unit in the polypropylene molecular chain, determined by $^{13}$C-NMR.

The copolymer portion of the propylene/ethylene block copolymer contains propylene at 65 to 85% by weight, preferably 67 to 75%. The propylene/ethylene block copolymer tends to have an insufficient tensile elongation when the propylene content is less than 65% by weight, and insufficient flexural modulus of elasticity when it is more than 85% by weight, and hence is undesirable.

(2) Production of the Propylene/Ethylene Block Copolymer

The propylene/ethylene block copolymer is produced in the presence of a catalyst of high stereoregularity. The examples of such catalysts include those produced by combining a titanium trichloride composition with an organoaluminum compound and aromatic carboxylate ester, where the titanium trichloride composition is produced by reducing titanium tetrachloride with an organoaluminum compound and treating the product with various electron donors and acceptors, as disclosed by Japanese Patent Laid-Open Nos.100806/1981, 120712/1981 and 104907/1983; and the impregnated type catalysts produced by bringing a magnesium halide into contact with an titanium tetrachloride and various electron donors, as disclosed by Japanese Patent Laid-Open Nos.63310/1982, 43915/1988 and 83116/1988.

The propylene/ethylene block copolymer is produced by copolymerization of propylene and ethylene in the presence of the above catalyst by a known method, e.g., vapor-phase fluidized bed, solution or slurry method.

(3) Content of the Propylene/Ethylene Block Copolymer

The above propylene/ethylene block copolymer is incorporated in the polypropylene-based resin composition of the present invention at 50 to 70% by weight, preferably 50 to 65%, more preferably 52 to 60%.

The polypropylene-based resin composition will have an insufficient flexural modulus of elasticity when the content is less than 50% by weight, and insufficient brittleness temperature when it is more than 70% by weight.

(B) Ethylene/Octene and/or Ethylene/Butene Random Copolymer (Component (B))

(1) Properties of the Ethylene/Octene and/or Ethylene/Butene Random Copolymer

The component (B) for the polypropylene-based resin composition of the present invention, i.e., an elastomer of ethylene/octene and/or ethylene/butene random copolymer, is used to improve impact resistance of the composition, and also make the composition exhibit good moldability, shrinkage characteristics and other properties. When combined with the component (C) described below, it makes the composition exhibit better property balances and moldability.

The elastomer as the component (B) contains the comonomer, 1-octene or 1-butene, at 28% by weight or more, and has an MFR (230° C., load: 2.16 kg) of 0.5 to 20 g/10 min., preferably 0.7 to 15 g/10 min., more preferably 0.9 to 10 g/10 min. At an MFR less than 0.5/10 min., the elastomer has an insufficient tensile elongation. At an MFR more than 20 g/10 min., on the other hand, the elastomer will have insufficient brittleness temperature. The elastomer will also have insufficient brittleness temperature when its comonomer content is less than 28% by weight.

The component (B), i.e., ethylene/octene and/or ethylene/butene random copolymer, may comprise one component or two or more components.

(2) Production of the Ethylene/Octene and/or Ethylene/Butene Random Copolymer

The component (B) is produced by copolymerization of ethylene with 1-octene or 1-butene in the presence of the so-called Ziegler type catalyst composed of a titanium compound (e.g., titanium halide), organoaluminum-magnesium complex (e.g., alkyl aluminum-magnesium or alkyl alkoxyaluminum-magnesium complex) and alkyl aluminum or alkyl aluminum chloride, or a metallocene catalyst disclosed by, e.g., WO-91/04257. In particular, the metallocene catalyst gives the copolymer having more preferable effects. It can be produced by a known polymerization method, e.g., vapor-phase fluidized bed, solution or slurry method.

(3) Content of the Ethylene/Octene and/or Ethylene/Butene Random Copolymer

The above ethylene/octene and/or ethylene/butene random copolymer is incorporated in the polypropylene-based resin composition of the present invention at 10 to 25% by weight, preferably 12 to 20%. The polypropylene-based resin composition will have an excessive difference between molding shrinkage and shrinkage after heating (hereinafter referred to as Δ shrinkage) when the content is less than 10% by weight, and insufficient flexural modulus of elasticity when it is more than 25% by weight, and hence is undesirable.

(C) Styrene-Based Hydrogenated Block Copolymer Rubber (Component (C))

(1) Structure of the Styrene-Based Hydrogenated Block Copolymer Rubber

The styrene-based hydrogenated block copolymer rubber (Component (C)) as the constituent of the polypropylene-based resin composition of the present invention is the elastomer component used to make the above-described component (B) exhibit the effect of improving impact resistance more effectively, even in a small quantity.

More concretely, this styrene-based hydrogenated block copolymer rubber contains the following segment A of polystyrene structure at 1 to 25% by weight:

A-B, or

A-B-A wherein, the segment A is a polystyrene structure and segment B is an ethylene/butene or ethylene/propylene structure.

The concrete examples of the above-described styrene-based hydrogenated block copolymer rubber include styrene/ethylene/butene/styrene block copolymer (SEBS) and styrene/ethylene/propylene/styrene block copolymer (SEPS).

The elastomer copolymer of the above block structure may be a mixture of the tri-block and di-block structures, described above.

Ratio of the segment A of the above-described polystyrene structure is 1 to 25% by weight, preferably 5 to 25%, more preferably 7 to 22%. The copolymer rubber will have insufficient brittleness temperature, when the ratio is more than 25% by weight, and is undesirable.

(2) Production of the Styrene-Based Hydrogenated Block Copolymer Rubber

The styrene-based hydrogenated block copolymer rubber as the component (C) may be produced by the common anion living polymerization, where styrene, butadiene and styrene are polymerized consecutively to produce the tri-block structure which is then hydrogenated (production of SEBS), or the di-block copolymer of styrene and butadiene is produced first, and then converted into the tri-block structure by the aid of a coupling agent and hydrogenated styrene/isoprene/styrene tri-block copolymer may be produced by replacing butadiene with isoprene (production of SEPS).

(3) Content of the Styrene-Based Hydrogenated Block Copolymer Rubber

The elastomer of the above structure as the component (C) is incorporated in the polypropylene-based resin composition of the present invention at 4 to 9% by weight, preferably 5 to 8%, more preferably 5 to 7%.

The polypropylene-based resin composition will have insufficient brittleness properties when the content is less than 4% by weight, and an insufficient flexural modulus of elasticity and excessive Δ shrinkage when it is more than 9% by weight, and hence is undesirable.

(D) Talc (Component (D))

(1) Properties of Talc

Talc (Component (D)) as the constituent of the polypropylene-based resin composition of the present invention has an average particle size of 10 μm or less, preferably 0.5 to 8 μm or less. The polypropylene-based resin composition has an insufficient flexural modulus of elasticity when the size is out of the above range, and hence is undesirable.

The average particle size can be determined from the cumulative particle size distribution curve at cumulative 50% by weight, the curve being prepared by a laser-aided diffraction analyzer (e.g., HORIBA's LA-920) or liquid layer settling type light transmission analyzer (e.g., SHIMADZU's CP). The average particle size was determined by the former method for the present invention.

The talc can be obtained by finely crushing naturally occurring one by a mechanical means, and classifying the particles precisely. The crushed particles may be classified first roughly and then more precisely.

The mechanical means include crushers, e.g., jaw, hammer, roll and jet crushers, and mills, e.g., screen, colloid, roll and vibration mills.

The crushed talc particles are classified by the wet or dry method once or repeatedly to have a desirable average size for the present invention. The useful devices for classifying them include cyclone, cyclone air separator, micro separator, and sharp-cut separator. It is preferable to crush the talc to have a size in a specific range, and classify the crushed particles by a sharp-cut separator, to prepare the talc for the present invention.

The talc may be surface-treated with various additives to improve its adhesion to or dispersibility in the polymer. These additives include a coupling agent of organic titanate, coupling agent of organic silane, graft-modified polyolefin of unsaturated carboxylic acid or its anhydride, fatty acid, metallic salt of fatty acid, and fatty acid ester.

(2) Content of Talc

It is important that the talc is incorporated in the polypropylene-based resin composition of the present invention at 16 to 24% by weight, preferably 19 to 22%.

The polypropylene-based resin composition will have an insufficient flexural modulus of elasticity when the content is less than 16% by weight, and an insufficient brittleness temperature when it is more than 24% by weight.

(E) Additional Components (Optional)

The polypropylene-based resin composition of the present invention may be incorporated with, in addition to the above essential components (A) to (D), one or more additional components (optional components), so long as the effect of the present invention is not notably damaged.

These additional components (optional components) useful for the present invention include antioxidant, e.g., phenol- and phosphorus-based ones; weathering-inhibiting agent, e.g., hindered amine-, benzophenone- and benzotriazole-based ones; nucleating agent, e.g., organoaluminum and organophosphorus compounds; dispersant represented by a metallic salt of stearic acid; colorant, e.g., quinacridon, perylene, phthalocyanine, titanium oxide and carbon black; whiskers, e.g., those of fibrous potassium titanate, fibrous magnesium oxysulfate, fibrous aluminum borate and calcium carbonate; and carbon fibers and glass fibers.

[II] Method of Producing Polypropylene-Based Resin Composition (1) Kneading

The polypropylene-based resin composition of the present invention is produced by kneading the above components by a common extruder, Banbury mixer, roll, Brabender Plastograph or kneader, set at around 180 to 250° C. Of these, an extruder, in particular biaxial type, is more preferable.

(2) Molding

The method for molding the polypropylene-based resin composition of the present invention is not limited. It may be molded by the method commonly used in the synthetic resin industry, e.g., injection molding, injection compression molding and blow molding, of which injection molding is more preferable for the effects of the present invention.

[III] Polypropylene-Based Resin Composition (1) Properties

The polypropylene-based resin composition of the present invention, produced by the above-described method, is good in fabricability for injection molding, and exhibits the following excellent properties with respect to flexural modulus of elasticity, brittleness temperature properties and tensile elongation:

(a) MFR: 36 to 50 g/10 Min.
(b) Flexural modulus of elasticity: 1750 MPa or more
(c) Brittleness temperature: −15° C. or lower
(d) Tensile elongation: 200% or more
(e) Internal molding pressure: 38 MPa or less
(f) Δ shrinkage: $1.5/1000$ or less (2) Purposes The polypropylene-based resin composition of the present invention, exhibiting the above-described favorable properties, can be molded into various shapes, preferably into automobile exteriors, e.g., bumpers, rocker moldings, sidemoldings and overfenders.

PREFERRED EMBODIMENTS

The present invention is described more concretely by EXAMPLES.

The following analytical methods and stock materials were used for EXAMPLES

[I] Analytical Methods (1) MFR: Determined in accordance with ASTM-D1238 at 230° C. and a load of 2.16 kg.
(2) Flexural modulus of elasticity: Determined in accordance with ASTM-D790 at 23° C. and a bending speed of 2 nm/min.

(3) Brittleness temperature: Determined in accordance with ASTM-D746.
(4) Tensile elongation: Determined in accordance with ASTM-D638 at 23° C. and a tensile speed of 10 mm/min.
(5) Internal molding pressure: Determined by the method described in EXAMPLES
(6) Δ shrinkage: Determined by the method described in EXAMPLES, and the samples having a Δ shrinkage of $^{1.5}/_{1000}$ or less are marked with "○" (which means "passed") and those having the value exceeding the above are marked with "x" (which means "not passed").
(7) Isotactic pentad fraction (P): Determined by the method described in Macromolecule, 8, 687 (1975) using $^{13}$C-NMR.

[II] Stock Materials (1) Propylene/Ethylene Block Copolymer (Component (A))

Table 1 shows the propylene/ethylene block copolymers used as the component (A) for the present invention.

Propylene/ethylene block copolymers (A)

| Types | Propylene homo-polymer component | | Block component | |
|---|---|---|---|---|
| | MFR (g/10 min.) | Isotactic pentad fraction (–) | MFR (g/10 min.) | Propylene content of the ethylene/propylene copolymer portion (wt. %) |
| PP-1 | 255 | 0.991 | 115 | 70 |
| PP-2 | 350 | 0.988 | 130 | 68 |
| PP-3 | 250 | 0.984 | 110 | 40 |
| PP-4 | 160 | 0.989 | 120 | 70 |
| PP-5 | 146 | 0.989 | 60 | 67 |
| PP-6 | 220 | 0.965 | 112 | 69 |
| PP-7 | 470 | 0.987 | 220 | 71 |
| PP-8 | PP-5 treated with an organic peroxide | | 118 | 67 |

PP-8 comprised 100 parts by weight of PP-5 incorporated with 0.01 parts by weight of 1,3-bis-(t-butylperoxypropyl)benzene (NOF Corporation; Perbutyl P), and granulated at 230° by a monoaxial extruder (Thermo Corporation; Thermo50) to have an MFR of 118 g/10 min.

(2) Ethylene/Octene and/or Ethylene/Butene Random Copolymer (Component (B))

Table 2 shows the elastomer components (Component (B)) used for the present invention.

TABLE 2

Elastomer components (Component (B))

| Types | MFR (g/10 min.) | Comonomer content (wt. %) | Comonomer type |
|---|---|---|---|
| Elastomer-1 | 1.9 | 41 | 1-octene |
| Elastomer-2 | 2.1 | 45 | 1-octene |
| Elastomer-3 | 1 | 31 | 1-butene |
| Elastomer-4 | 0.8 | 32 | 1-butene |
| Elastomer-5 | 2.1 | 19 | 1-butene |
| Elastomer-6 | 59 | 39 | 1-octene |

(3) Styrene-Based Hydrogenated Block Copolymer Rubber (Component (C))

Table 3 shows the elastomer components (Component (C)) used for the present invention.

TABLE 3

| Types | MFR (g/10 min.) | Types | Styrene content (wt. %) | Structures |
|---|---|---|---|---|
| Styrene-1 | 10 | SEBS | 14 | di-block/tri-block |
| Styrene-2 | 4 | SEBS | 19 | tri-block |
| Styrene-3 | 4 | SEPS | 20 | tri-block |
| Styrene-4 | 2 | SEBS | 30 | tri-block |

(4) Talc (Component (D))

Table 4 shows talc as the component (D) used for the present invention.

TABLE 4

Talc component (Component (D))

| Types | Average particle size (μm) |
|---|---|
| Talc-1 | 7 |
| Talc-2 | 18 |

EXAMPLES 1 TO 12 and COMPARATIVE EXAMPLES 1 TO 14

The stock materials shown in Tables 1 to 4 were mixed in a ratio given in Table 5 or 6, and 100 parts by weight of each composition was incorporated with 0.1 parts by weight of tetrakis[methylene-3-(3'5'-di-t-butyl-4'-hydroxyphenyl)propionate] methane (Ciba-Geigy's IRGANOX1010) and 0.3 parts by weight of zinc behenate by a mixer (KAWATA's Supermixer) for 5 minutes and then kneaded/granulated at a set temperature of 210° C. by a biaxial kneader (Kobe Steel's 2FCM), to prepare the polypropylene-based resin composition.

Each composition was then molded at 210° C. by an injection molder with a clamping force of 350 tons, to prepare the test piece which was used to determine the properties in accordance with the above-described methods. The results are given in Tables 7 and 8.

The test piece, 120 by 120 mm and 3 mm thick, was also prepared by injection molding at 220° C., and kept at 23° C. for 48 hours to adjust the conditions, to be analyzed for molding shrinkage in the resin flow direction by distance between the marked lines. It was heated at 120° C. for 40 minutes in a gear oven, and then kept at 23° C. for 48 hours to adjust the conditions, to be analyzed for shrinkage after heating also by distance between the marked lines. The Δ shrinkage was determined by the difference between the shrinkage after heating and molding shrinkage values.

Each composition was also molded at 220° C. by an injection molder with a clamping force of 170 tons using a box-shaped mold with an embedded piezoelectric cavity pressure sensor, to measure the peak cavity pressure (internal molding pressure) during the filling process in the vicinity of the gate. The results are given in Tables 7 and 8.

TABLE 5

| | PP(A) | | Elastomer component (B) | | Elastomer component (C) | | Talc (D) | |
|---|---|---|---|---|---|---|---|---|
| | Types | wt. % | Types | wt. % | Types | wt. % | Types | wt. % |
| EXAMPLE 1 | PP-1 | 57 | Elastomer-1 | 16 | Styrene-1 | 7 | Talc-1 | 20 |
| EXAMPLE 2 | PP-1 | 53 | Elastomer-1 | 20 | Styrene-1 | 7 | Talc-1 | 20 |
| EXAMPLE 3 | PP-1 | 61 | Elastomer-1 | 12 | Styrene-1 | 7 | Talc-1 | 20 |
| EXAMPLE 4 | PP-1 | 57 | Elastomer-1 | 16 | Styrene-1 | 8.5 | Talc-1 | 18.5 |
| EXAMPLE 5 | PP-1 | 54 | Elastomer-1 | 16 | Styrene-1 | 7 | Talc-1 | 23 |
| EXAMPLE 6 | PP-1 | 59 | Elastomer-1 | 16 | Styrene-1 | 7 | Talc-1 | 18 |
| EXAMPLE 7 | PP-2 | 57 | Elastomer-1 | 16 | Styrene-2 | 7 | Talc-1 | 20 |
| EXAMPLE 8 | PP-1 | 57 | Elastomer-2 | 16 | Styrene-2 | 7 | Talc-1 | 20 |
| EXAMPLE 9 | PP-1 | 57 | Elastomer-3 | 16 | Styrene-1 | 7 | Talc-1 | 20 |
| EXAMPLE 10 | PP-1 | 59 | Elastomer-4 | 14 | Styrene-1 | 7 | Talc-1 | 20 |
| EXAMPLE 11 | PP-1 | 57 | Elastomer-1 | 16 | Styrene-2 | 7 | Talc-1 | 20 |
| EXAMPLE 12 | PP-1 | 57 | Elastomer-1 | 16 | Styrene-3 | 7 | Talc-1 | 20 |

TABLE 6

| | PP(A) | | Elastomer component (B) | | Elastomer component (C) | | Talc (D) | |
|---|---|---|---|---|---|---|---|---|
| | Types | wt. % | Types | wt. % | Types | wt. % | Types | wt. % |
| COMPARATIVE EXAMPLE 1 | PP-1 | 80 | Elastomer-1 | 10 | Styrene-1 | 3 | Talc-1 | 7 |
| COMPARATIVE EXAMPLE 2 | PP-1 | 40 | Elastomer-1 | 30 | Styrene-1 | 12 | Talc-1 | 18 |
| COMPARATIVE EXAMPLE 3 | PP-1 | 51 | Elastomer-1 | 14 | Styrene-1 | 5 | Talc-1 | 30 |
| COMPARATIVE EXAMPLE 4 | PP-3 | 57 | Elastomer-1 | 16 | Styrene-1 | 7 | Talc-1 | 20 |
| COMPARATIVE EXAMPLE 5 | PP-4 | 57 | Elastomer-1 | 16 | Styrene-1 | 7 | Talc-1 | 20 |
| COMPARATIVE EXAMPLE 6 | PP-5 | 57 | Elastomer-1 | 16 | Styrene-1 | 7 | Talc-1 | 20 |
| COMPARATIVE EXAMPLE 7 | PP-6 | 53 | Elastomer-1 | 20 | Styrene-3 | 7 | Talc-1 | 20 |
| COMPARATIVE EXAMPLE 8 | PP-1 | 57 | Elastomer-5 | 16 | Styrene-1 | 7 | Talc-1 | 20 |
| COMPARATIVE EXAMPLE 9 | PP-1 | 57 | Elastomer-6 | 16 | Styrene-1 | 7 | Talc-1 | 20 |
| COMPARATIVE EXAMPLE 10 | PP-1 | 57 | Elastomer-1 | 16 | Styrene-4 | 7 | Talc-1 | 20 |
| COMPARATIVE EXAMPLE 11 | PP-1 | 53 | Elastomer-1 | 20 | Styrene-1 | 7 | Talc-2 | 20 |
| COMPARATIVE EXAMPLE 12 | PP-1 | 60 | Elastomer-1 | 2 | Styrene-2 | 18 | Talc-1 | 20 |
| COMPARATIVE EXAMPLE 13 | PP-7 | 57 | Elastomer-1 | 16 | Styrene-2 | 7 | Talc-1 | 20 |
| COMPARATIVE EXAMPLE 14 | PP-8 | 57 | Elastomer-1 | 16 | Styrene-1 | 7 | Talc-1 | 20 |

TABLE 7

| | Properties | | | | | |
|---|---|---|---|---|---|---|
| | MFR (g/10 min.) | Flexural modulus of easticity (MPa) | Brittleness temperature (° C.) | Tensile elongation (%) | Internal molding pressure (MPa) | Δ shrinkage |
| EXAMPLE 1 | 41 | 2250 | −25 | 250 | 36 | ◯ |
| EXAMPLE 2 | 36 | 2030 | −30≧ | 380 | 37 | ◯ |
| EXAMPLE 3 | 50 | 2450 | −16 | 209 | 35 | ◯ |
| EXAMPLE 4 | 38 | 2110 | −30≧ | 250 | 36 | ◯ |
| EXAMPLE 5 | 41 | 2400 | −24 | 230 | 37 | ◯ |
| EXAMPLE 6 | 42 | 2130 | −23 | 270 | 35 | ◯ |
| EXAMPLE 7 | 48 | 2270 | −22 | 260 | 34 | ◯ |
| EXAMPLE 8 | 41 | 2160 | −28 | 250 | 36 | ◯ |
| EXAMPLE 9 | 37 | 2280 | −18 | 400≦ | 35 | ◯ |
| EXAMPLE 10 | 37 | 2300 | −17 | 390 | 36 | ◯ |

TABLE 7-continued

| | MFR (g/10 min.) | Flexural modulus of easticity (MPa) | Brittleness temperature (° C.) | Tensile elongation (%) | Internal molding pressure (MPa) | Δ shrinkage |
|---|---|---|---|---|---|---|
| | | | Properties | | | |
| EXAMPLE 11 | 39 | 2260 | −26 | 350 | 36 | ○ |
| EXAMPLE 12 | 38 | 2230 | −27 | 250 | 36 | ○ |

TABLE 8

| | MFR (g/10 min.) | Flexural modulus of easticity (MPa) | Brittleness temperature (° C.) | Tensile elongation (%) | Internal molding pressure (MPa) | Δ shrinkage |
|---|---|---|---|---|---|---|
| | | | Properties | | | |
| COMPARATIVE EXAMPLE 1 | 65 | 1670 | 0≦ | 20 | 33 | X |
| COMPARATIVE EXAMPLE 2 | 18 | 1270 | −30≧ | 400≦ | 41 | ○ |
| COMPARATIVE EXAMPLE 3 | 37 | 2700 | −2 | 30 | 37 | ○ |
| COMPARATIVE EXAMPLE 4 | 40 | 2270 | −27 | 100 | 35 | ○ |
| COMPARATIVE EXAMPLE 5 | 43 | 2200 | −25 | 300 | 39 | ○ |
| COMPARATIVE EXAMPLE 6 | 28 | 2160 | −25 | 400≦ | 39 | ○ |
| COMPARATIVE EXAMPLE 7 | 35 | 1760 | −30≧ | 400≦ | 37 | ○ |
| COMPARATIVE EXAMPLE 8 | 42 | 2350 | −8 | 400≦ | 36 | ○ |
| COMPARATIVE EXAMPLE 9 | 69 | 2140 | −13 | 150 | 34 | ○ |
| COMPARATIVE EXAMPLE 10 | 36 | 2250 | −9 | 180 | 37 | ○ |
| COMPARATIVE EXAMPLE 11 | 41 | 1620 | −28 | 350 | 36 | ○ |
| COMPARATIVE EXAMPLE 12 | 47 | 1960 | −30≧ | 130 | 38 | X |
| COMPARATIVE EXAMPLE 13 | 57 | 2260 | −3 | 15 | 34 | ○ |
| COMPARATIVE EXAMPLE 14 | 42 | 2200 | −26 | 350 | 42 | ○ |

INDUSTRIAL APPLICABILITY

The polypropylene resin composition of the present invention is high in melting flow, exhibiting good properties and excellent in internal molding pressure, and hence can be molded into various types of articles, in particular automobile exteriors, e.g., bumpers, rocker moldings, sidemoldings and overfenders.

What is claimed is:

1. A polypropylene-based resin composition comprising the following components (A) to (D), characterized by its excellent moldability and other properties:

50 to 70% by weight component (A): propylene/ethylene block copolymer having a melt flow rate (MFR) of 100 to 200 g//10 min., its propylene homopolymer component having an MFR of 210 to 400 g/10 min. and isotactic pentad fraction of 0.98 or more, and its copolymer portion containing propylene at 65 to 85% by weight;

10 to 25% by weight component (B): ethylene/octene and/or ethylene/butene random copolymer, containing the comonomers at 28% by weight or more for the copolymerization and having an MFR of 0.5 to 20 g/10 min.;

4 to 9% by weight component (C): styrene-based hydrogenated block copolymer rubber having the structure A-B or A-B-A wherein the segment A is a polystyrene structure and segment B is an ethylene/butene or ethylene/propylene structure, containing the segment A of polystyrene structure at 1 to 25% by weight; and 16 to 24% by weight component (D): talc, having an average particle size of 10 mm or less, determined by the laser-aided diffractometry.

2. The polypropylene based resin composition according to claim 1 having an internal molding pressure of 38 MPa or less, MFR of 36 to 50 g/10 min., flexural modulus of elasticity of 1750 MPa or more, brittleness temperature of −15° C. or lower, tensile elongation of 200% or more, and difference between molding shrinkage and shrinkage after heating of 1.5/1000 or less.

* * * * *